United States Patent [19]
Ohtaka et al.

[11] Patent Number: 5,634,816
[45] Date of Patent: Jun. 3, 1997

[54] STRUCTURE OF MOUNTING ELECTRICAL UNIT ON WALL SURFACE

[75] Inventors: Kazuto Ohtaka; Isao Kameyama, both of Shizuoka, Japan

[73] Assignee: Yazaki Corporation, Tokyo, Japan

[21] Appl. No.: 511,154

[22] Filed: Aug. 4, 1995

[30] Foreign Application Priority Data

Aug. 4, 1994 [JP] Japan .................. 6-183615

[51] Int. Cl.⁶ .................................. H01R 13/73
[52] U.S. Cl. .................................. 439/546
[58] Field of Search .................. 439/529, 313, 439/310, 341, 338, 343, 342, 533, 537, 334, 259

[56] References Cited

FOREIGN PATENT DOCUMENTS 3-28039  3/1991  Japan .
3-66178  6/1991  Japan .

*Primary Examiner*—Gary F. Paumen
*Attorney, Agent, or Firm*—Sughrue, Mion, Zinn, Macpeak & Seas

[57] ABSTRACT

A guide shaft having a withdrawal prevention projection is formed on a first connector connected to a power source. A fixing bracket, which has a guide groove for guiding and holding the guide shaft, and a rotation guide shaft for guiding the rotation of a lamp body, is fixedly mounted on a molded ceiling. The rotation guide shaft has a rotation stopping projection. The lamp body has a guide bearing which has a guide groove engaged with the rotation stopping projection, and is engaged with the rotation guide shaft. A second connector, connected to the lamp body, is fittingly connected to the first connector while being rotated.

6 Claims, 8 Drawing Sheets

1

STRUCTURE OF MOUNTING ELECTRICAL UNIT ON WALL SURFACE

BACKGROUND OF THE INVENTION

1. Field of the Invention

This invention relates to a structure of mounting an electrical unit on a wall surface (hereinafter referred to as "electrical unit-mounting structure"), which eliminates inconvenience developing between the electrical appliance, mounted on the wall surface such as a ceiling of an automobile, and the wall surface.

2. Background

One conventional structure of mounting an electrical unit on a ceiling as of an automobile is proposed in Japanese Utility Model Unexamined Publication No. 3-66178.

FIG. 9 is an exploded, perspective view of the conventional electrical unit-mounting structure. In FIG. 9, a roof wire harness 31 is secured by clamps 32 to a panel 33 of a vehicle, and then a molded ceiling 34, comprising a foamed material covered with a covering material, is fixedly secured to the vehicle panel 33. At this time, connectors 35, connected respectively to two distal ends of the wire harness 31, are beforehand disposed respectively in openings 34a formed through the molded ceiling 34. Then, the connectors 35 at the distal ends of the wire harness 31 are connected respectively to connection portions 36a of electrical equipments 36 such as room lamps, and the electrical equipments 36 are fixedly secured to the molded ceiling 36 by bolts 37, and a cover 38 is fitted on each electrical equipment 36.

FIG. 10 is a perspective view of an important portion of the conventional electrical unit-mounting structure. In the mounting of an electrical appliance such as an interior lamp, wires hang down during the mounting operation, and hence interferes with this operation. Also, ends of wires, connected to the appliance, and ends of wires connected to a power source are not disposed at constant positions. These cause various inconveniences. To overcome these inconveniences, there has been proposed a method of fixedly securing each connector to the electrical appliance.

As shown in FIG. 10, a connector 42 is connected to an electrical appliance, and has a connector housing 42a in which male connection terminals 42b, fixedly connected respectively to one ends of wires 43a, are received. This connector 42 is retained by mounting members 41a formed on a mounting plate 41 integrally supported on a back side of the electrical appliance 43. A connector 35 connected to a power source is beforehand mounted, and this connector 35 has a connector housing 35a in which female connection terminals (not shown), fixedly connected respectively to one ends of wires 31a connected to the power source, are received. The power source-side connector 35 is fitted into the electrical appliance-side connector 42, and then the mounting plate 41 is fixedly secured to a front face of a molded ceiling 34 at a mounting opening 34a, formed through a predetermined portion of this ceiling 34, by screws or the like passing through respective mounting holes 41b.

In the above conventional construction, however, much time and labor are required for mounting the electrical equipment, and besides the wire harness hangs down during the mounting operation, and the operation can not be easily effected in a narrow space. This has resulted in a problem that the efficiency of the operation can not be enhanced.

Furthermore, from the viewpoint of the operation, the wire harness need to have an excessive length, and therefore it is possible that extra portions of the wires 31a connected to the power source-side connector 35 are held or clamped between the edge of the mounting opening 34a and the mounting plate 41 during the mounting of the mounting plate on the molded ceiling 34.

This has resulted in a problem that the wires connected to the power source are cut, thus causing short-circuiting. And besides, when the wires are thus clamped between the above two portions, the unit is attached to the wall in an incomplete condition, which has invited a problem that the electrical appliance shakes upon application of vibrations and impacts.

SUMMARY OF THE INVENTION

The present invention has been made in view of the above problems, and an object of the invention to provide a structure of mounting an electrical unit on a wall surface, in which wires do not need to have an excessive length, and the cutting and short-circuiting of the wires due to wire clamping are prevented, and an enhanced efficiency of the operation is achieved.

The above object of the invention has been achieved by a structure of mounting an electrical unit on a wall surface wherein an electrical appliance is energized through a first connector which is connected to a power source, and is used for mounting wires connected to the electrical appliance; wherein a guide shaft having first withdrawal prevention member is mounted on the first connector; a fixing bracket, which has second withdrawal prevention member for guiding and holding the guide shaft, and a rotation guide shaft for guiding the rotation of the electrical appliance, is mounted on the wall surface; a guide bearing is engaged with the rotation guide shaft; and a second connector, connected to the electrical appliance, is connected to the first connector while being rotated.

The above object can be achieved by a construction in which the first withdrawal prevention member comprises a withdrawal prevention projection formed on the guide shaft, while the second withdrawal prevention member comprises an arcuate guide groove formed in the fixing bracket.

The above object can be achieved by a construction in which a thin connection member is integrally molded with the first connector and the fixing bracket to connect them together, the thin connection member being cut off when the electrical appliance is rotated.

The above object can be achieved by a construction in which a rotation stopping projection is formed on the rotation guide shaft, and an L-shaped guide groove is formed in the guide bearing.

The above object can be achieved by a construction in which a rotation fixing projection is provided on a lower surface of the fixing bracket, and is urged downward by a resilient member, and a rotation fixing hole engageable with the rotation fixing projection is formed in an upper surface of the first connector, the projection being provided at such a position that when the first connector is completely connected to the second connector by rotating the electrical appliance, the projection is held against a side surface of the second connector, thereby preventing a reverse rotation of the electrical appliance.

In the above electrical unit-mounting structure of the present invention, the fixing bracket is first fixedly secured to the wall surface, and the withdrawal prevention projection on the guide shaft is engaged in the arcuate guide groove, so that the positioning of the first connector is effected. Then, the guide bearing on the electrical appliance is fitted on and guided by the rotation guide shaft on the fixing bracket. At this time, the rotation stopping projection on the rotation guide shaft is introduced into the L-shaped guide groove. Then, when the electrical appliance is rotated about the rotation guide shaft, the first connector is rotated through about 90 degrees to be inserted into the second connector, so that the rotation stopping projection reaches the extremity of the L-shaped guide groove to thereby stop the rotation, thus completing the connection.

When the rotation of the electrical appliance begins, the rotation stopping projection, engaged in the rotation stopping hole in the first connector, is disengaged therefrom by the upper surface of the second connector. When the rotation is completed, the rotation stopping projection is disengaged from the upper surface of the second connector, and is held against the side surface of the second connector, thereby preventing a reverse rotation of the electrical appliance.

Therefore, after the fixing bracket is mounted on the wall surface, the electrical appliance can be attached merely by pushing it upwardly and then by rotating it horizontally. Thus, a good efficiency of the operation can be achieved. Also, the first connector can be connected to the second connector merely by rotating the first connector through about 90 degrees about the rotation guide shaft, and therefore the first connector does not need to have an excessive length. Therefore, the cutting and short-circuiting of wires due to wire clamping resulting from a mistake in the operation will not occur.

DETAILED DESCRIPTION OF THE PREFERRED EMBODIMENTS

Figure 1:
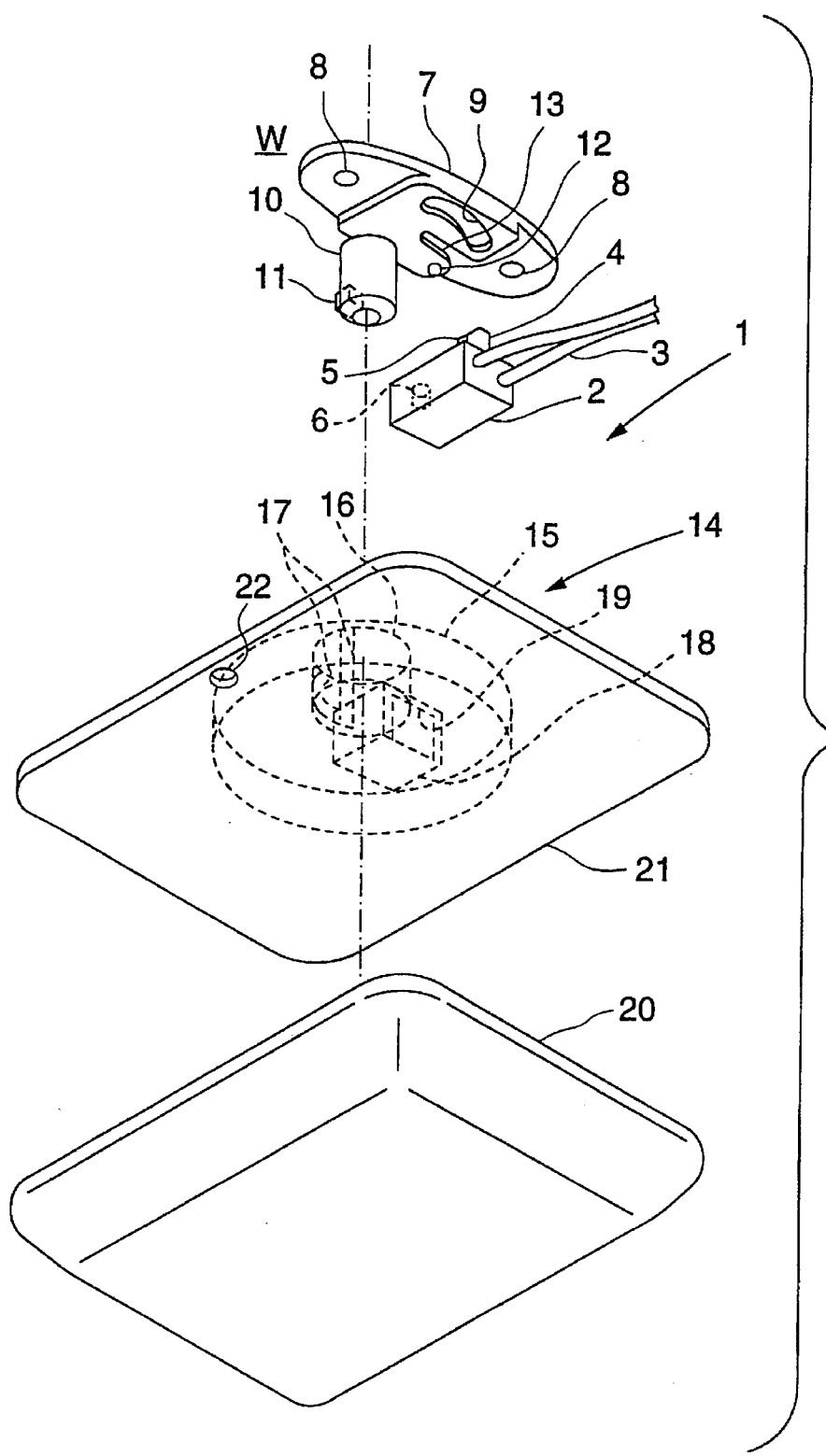
FIG. 1 is an exploded, perspective view of one preferred embodiment of an electrical unit-mounting structure of the present invention.

One preferred embodiment of an electrical unit-mounting structure of the present invention will now be described in detail with reference to FIGS. 1 to 8. FIG. 1 is an exploded, perspective view of the embodiment of the invention. As shown in FIG. 1, an electrical unit 1 comprises a first connector 2, a fixing bracket 7, a lamp body (electrical appliance) 14, and a lens 20 also serving as a cover.

Power source-side wires 3, branching off from a roof wire harness mounted on a ceiling of an automobile or the like, are connected to the first connector 2, and connection terminals (not shown) to be connected to a second connector 18 (described later) is received in the first connector 2. A guide shaft 4 for absorbing a reaction force produced when the first connector 2 is to be fitted into the second connector 18 is formed on an upper surface of the first connector 2. A withdrawal prevention projection 5, serving as a first member for preventing the dropping during the operation, is formed on a cylindrical surface of the guide shaft 4 adjacent to an upper end thereof. A rotation fixing hole 6 for fixing the direction of the first connector 2 at the time of starting the operation is formed in the upper surface of the first connector 2.

The fixing bracket 7 has mounting holes 8 through which this fixing bracket is fixedly secured to a foamed ceiling (wall surface) W covered with a covering material. An arcuate guide groove 9, which guides the guide shaft 4, and serves as a second member for retaining the withdrawal prevention projection 5, is formed in the fixing bracket 7. A rotation guide shaft 10 for guiding the rotation of the lamp body 14 (described later) extends downwardly from the fixing bracket 7. A rotation stopping projection 11, serving as a first stopping member for limiting the rotation of the lamp body 14, is formed on a cylindrical surface of the rotation guide shaft 10 adjacent to a lower end thereof. The fixing bracket 7 has a rotation fixing projection 12 for holding the direction of the retained first connector 2 and for maintaining the position of the second connector 18 after the rotation. This projection 12 is urged downward by a leaf spring 13.

Figure 2:
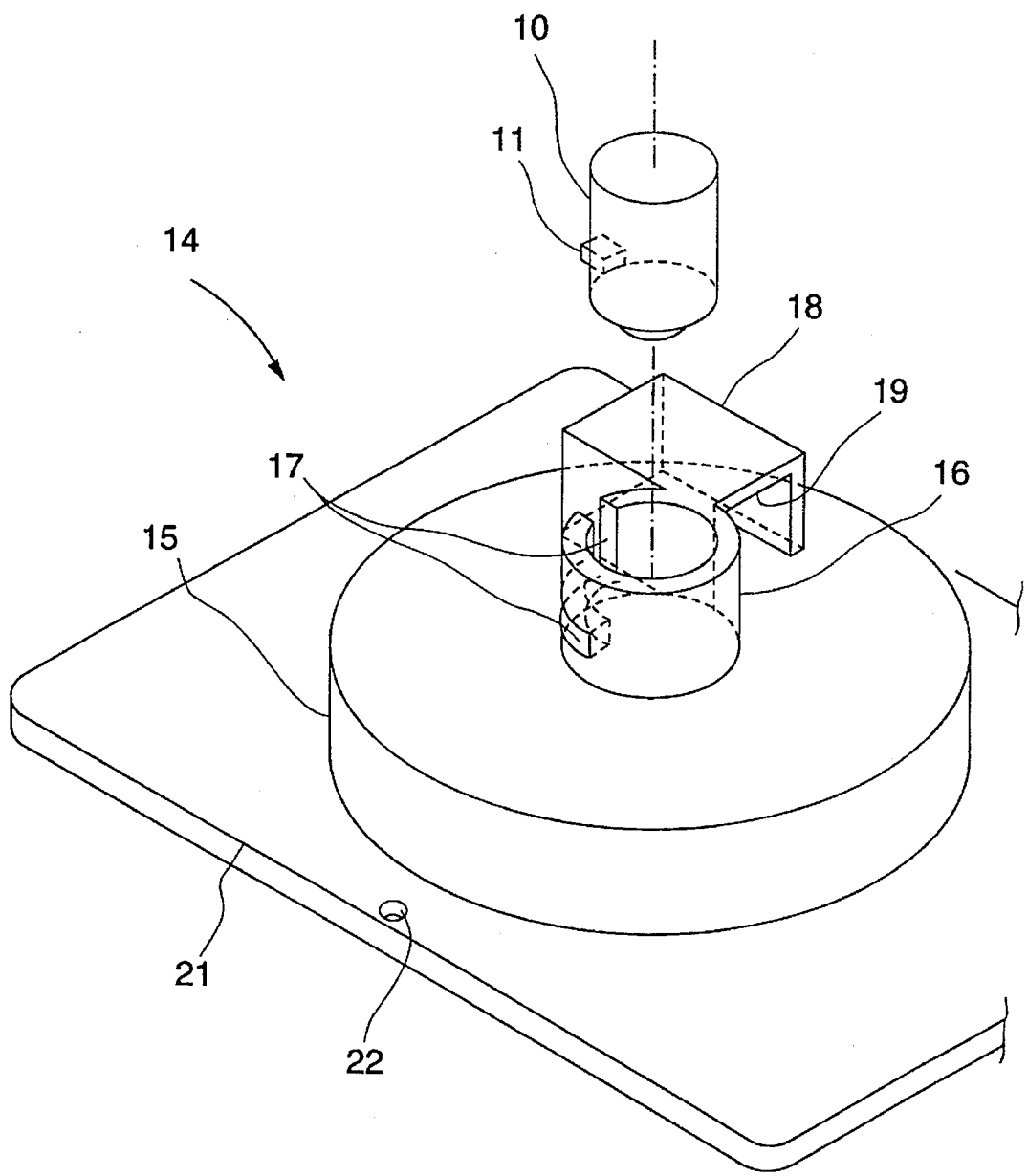
FIG. 2 is a perspective view showing an electrical appliance and associated parts in FIG. 1.

As shown in FIG. 2, in the lamp body 14, a hollow cylindrical guide bearing 16 is formed on an upper surface of a disk-shaped portion 15 at a central portion thereof, the rotation guide shaft 10 received in the guide bearing 16, and the rotation of the lamp body 14 is guided by the rotation guide shaft 10. An L-shaped guide groove 17, formed by a vertical groove and a horizontal groove, is formed in the guide bearing 16, and serves as a second stopping member. This guide groove 17 guides the rotation stopping projection 11, and also limits the rotation of the lamp body 14.

The second connector 18 is mounted on the upper surface of the disk-shaped portion 15, and the first connector 2 is fitted into the second connector 18 through an opening 19. Lamp body-side connection terminals (not shown) are provided at an inner portion of the opening 19. A guide plate 21 for guiding the lens 20 is mounted on the lamp body 14. The guide plate 21 has a screw hole 22 through which the lamp body 14 is finally fixedly secured to the molded ceiling W. A mating screw hole 23 is formed in the molded ceiling W.

Figure 11:
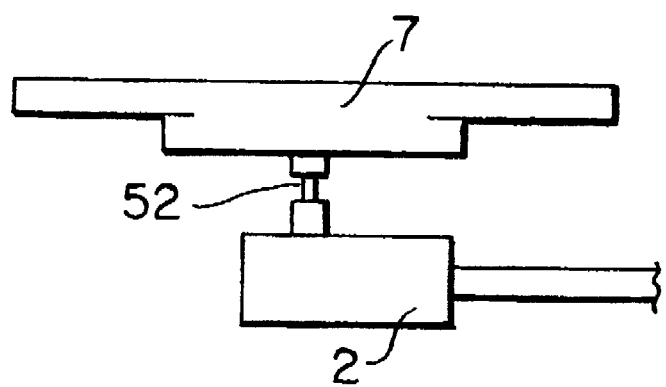
FIG. 11 is a side-elevation view showing the thin connection member.

Referring to FIG. 11, a thin connection member 52 is integrally molded between the first connector 2 and the fixing bracket 7, and the first connector 2 is held in an operation-starting position of the fixing bracket 7 at the time of starting the operation, and when the lamp body 14 is rotated, this thin connection member is cut off.

The operation of the above construction of this embodiment will now be described with reference to FIGS. 3 to 8.

As shown in FIGS. 3 to 7, the fixing bracket 7 is fixedly secured to the molded ceiling W by screws or the like passing through the respective mounting holes 8, and then the guide shaft 4 and the withdrawal prevention projection 5, which are provided on the first connector 2, are engaged in the guide groove 9. In this condition, since the rotation fixing projection 12 is engaged in the rotation fixing hole 6, the first connector 2 is prevented from disengagement from the fixing bracket 7, and is also positioned.

Figure 3:
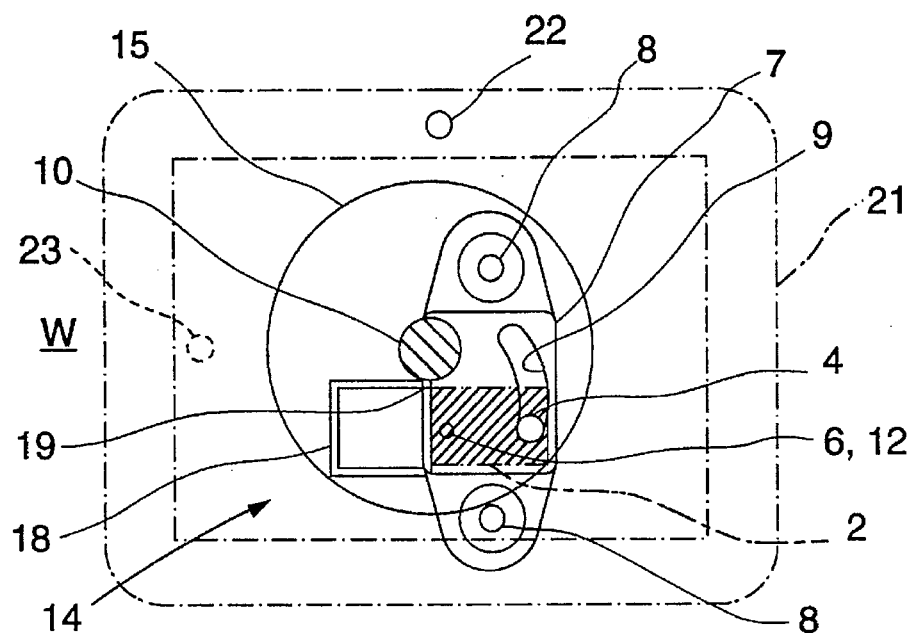
FIG. 3 is a view explanatory of the operation, showing a condition before a lamp body in FIG. 1 is rotated.
Figure 7:
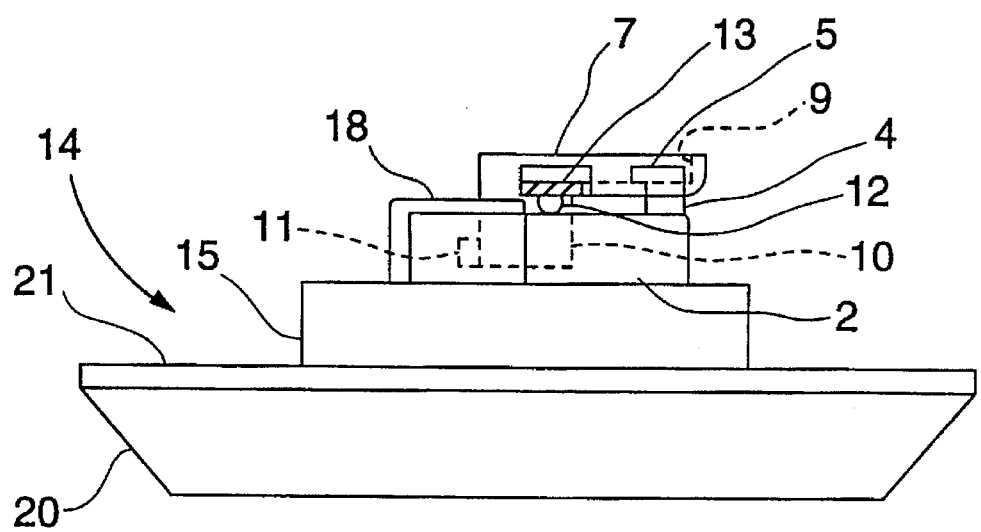
FIG. 7 is a side-elevational view showing the condition of FIG. 3.

Then, the lamp body 14 is pushed upward to fit the guide bearing 16 on the rotation guide shaft 10, so that the rotation stopping projection 11 is introduced into the L-shaped guide groove 17, and reaches a lower end of the vertical groove thereof. FIG. 3 shows this condition as viewed from the bottom, and FIG. 7 shows this condition as viewed from the side.

Figure 4:
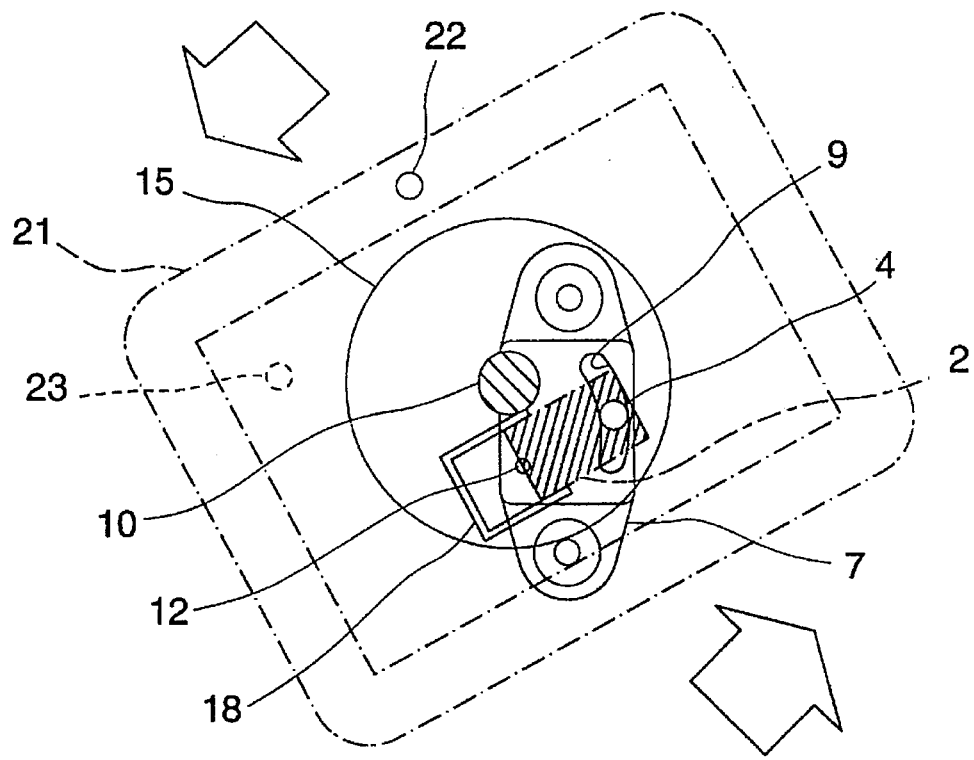
FIG. 4 is a view explanatory of the operation, showing a condition in which the rotation of the lamp body begins.
Figure 8:
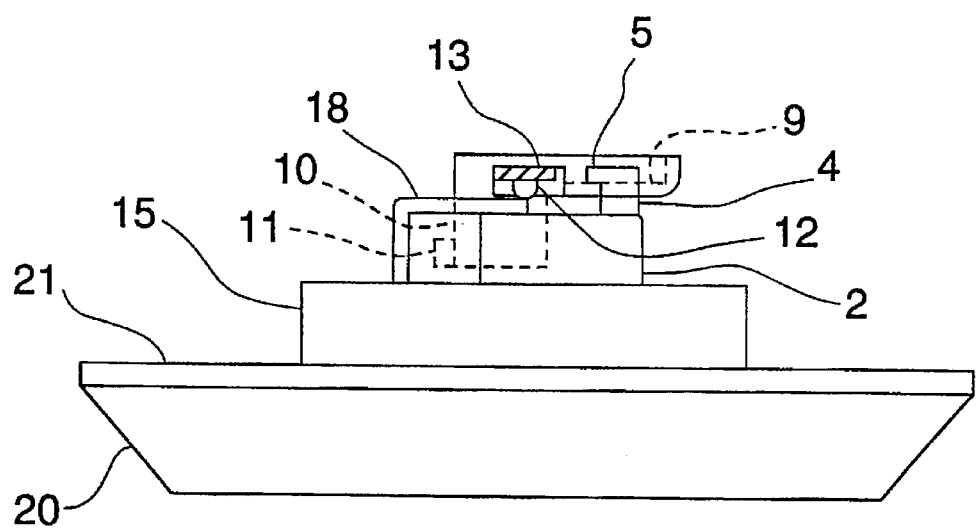
FIG. 8 is a side-elevational view showing the condition of FIG. 4.
Figure 9:
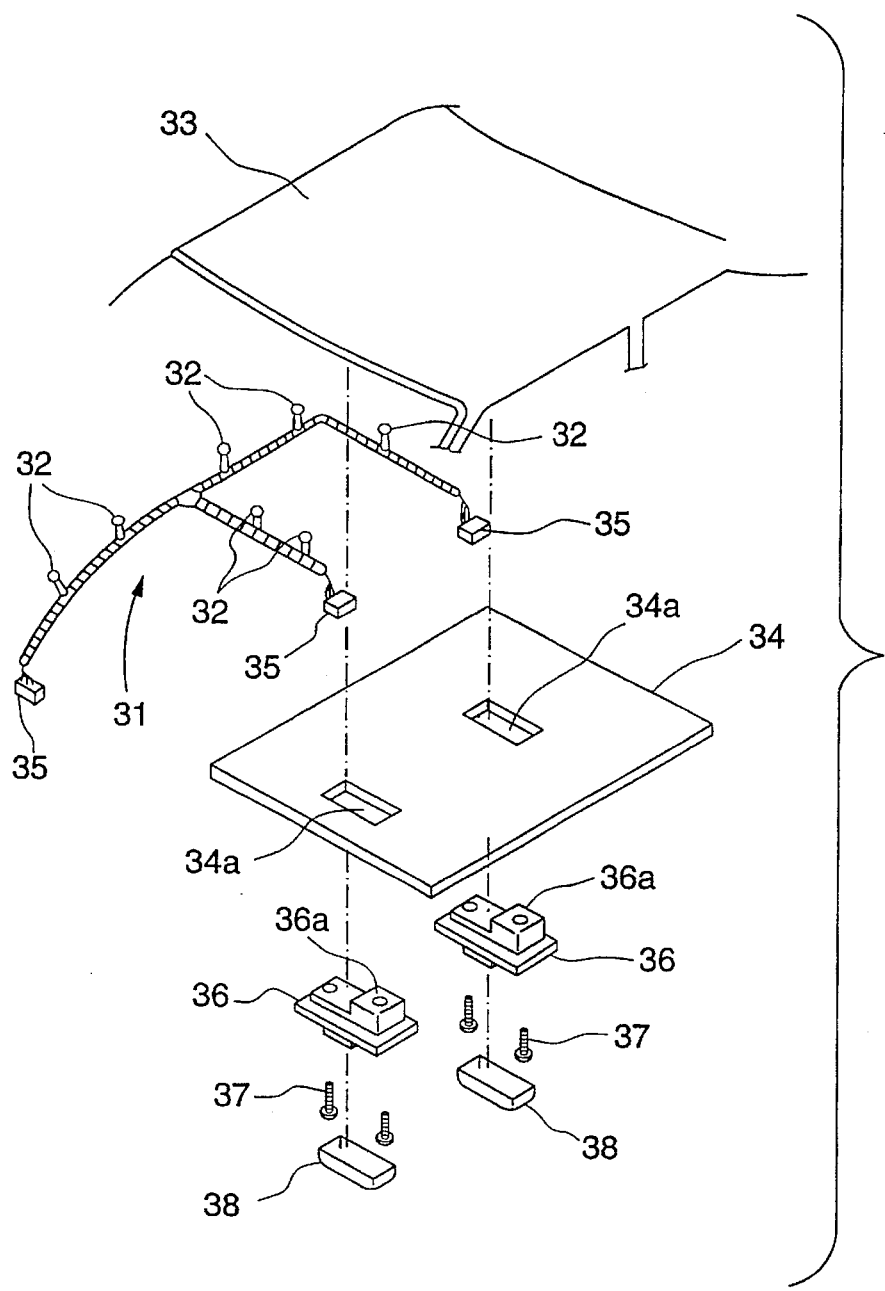
FIG. 9 is an exploded, perspective view of a conventional electrical unit-mounting structure.
Figure 10:
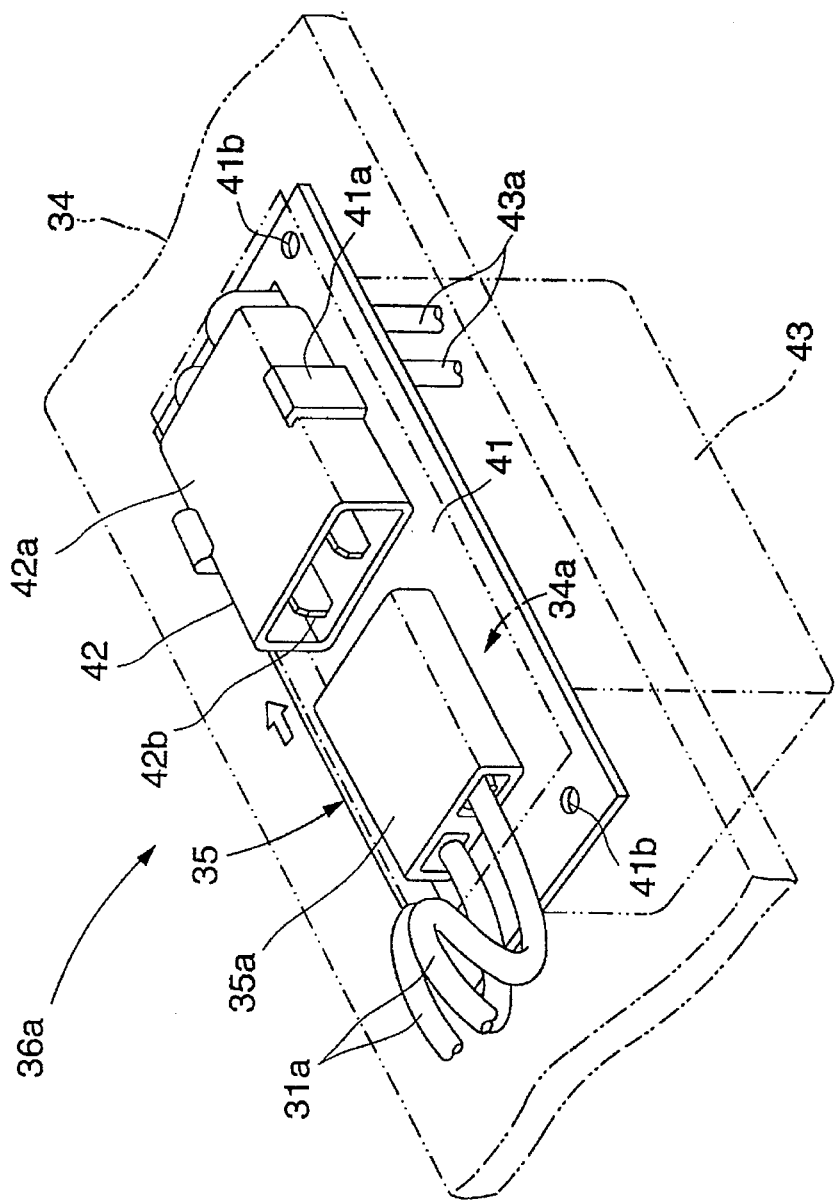
FIG. 10 is a perspective view of an important portion of the structure of FIG. 9.

Then, when the lamp body 14 is rotated left about the rotation guide shaft 10 as shown in FIG. 4, the first connector 2 is fitted into the second connector 18. At this time, the projection 12 is urged upward by the upper surface of the second connector 18 against the bias of the leaf spring 13, so that the projection 12 is disengaged from the hole 6, as shown in FIG. 8. Therefore, the first connector 2 is positioned while guided by the guide groove 9 and inner surfaces of the second connector 18.

Figure 5:
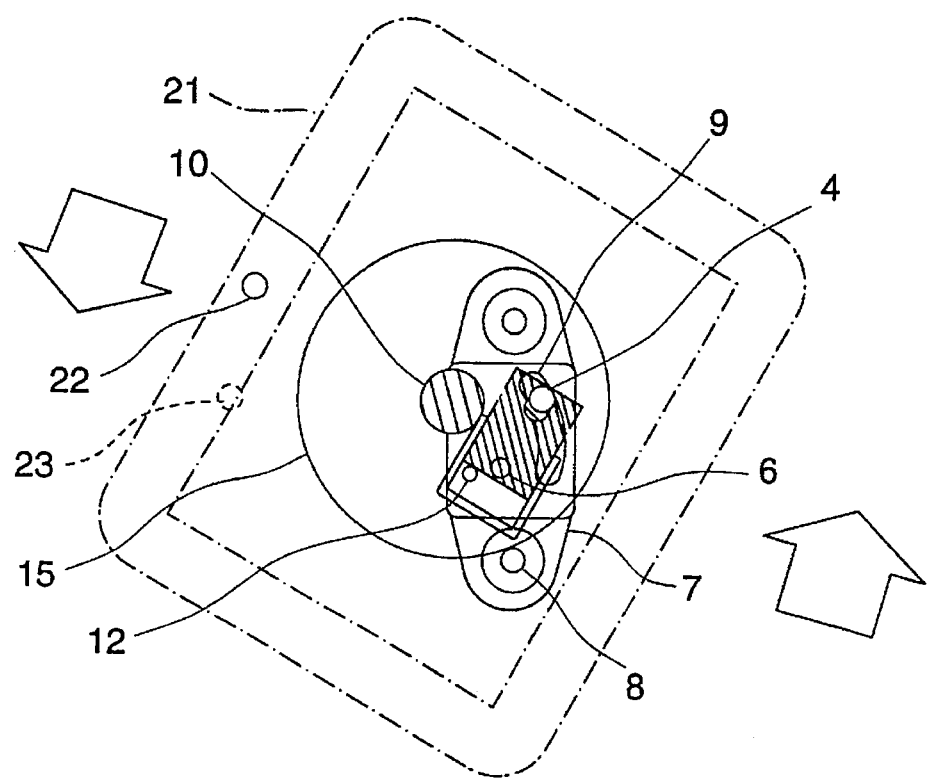
FIG. 5 is a view explanatory of the operation, showing a condition during the rotation of the lamp body.

Then, when the lamp body 14 is further rotated as shown in FIG. 5, the first connector 2 is inserted deeper into the second connector 18, so that the projection 12 slides over the upper surface of the second connector 18, and reaches a position shown in this Figure. Also, the screw hole 22 approaches the screw hole 23 in the molded ceiling W.

Figure 6:
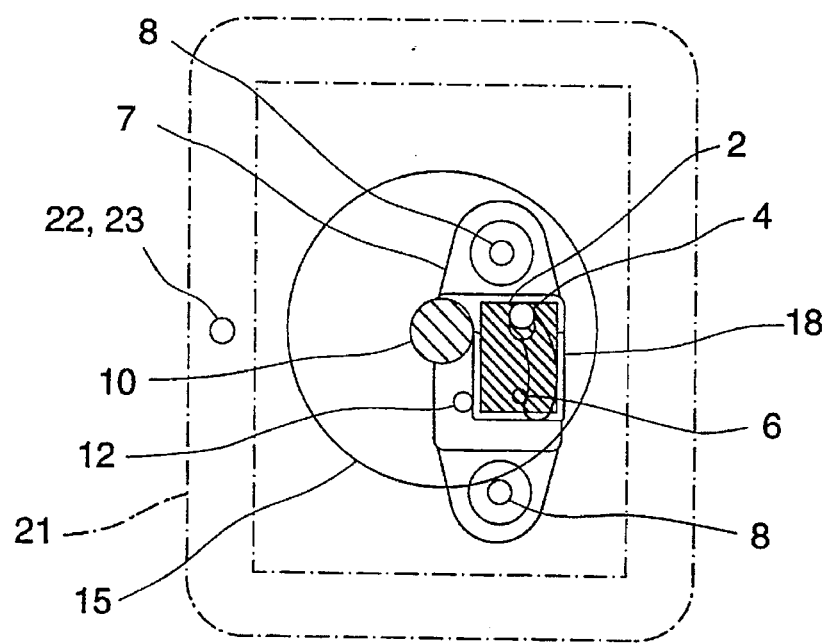
FIG. 6 is a view explanatory of the operation, showing a condition in which the rotation of the lamp body is completed.

Then, when the lamp body 14 is still further rotated as shown in FIG. 6, the first connector 2 is completely fitted in and connected to the second connector 18, and also the projection 12 is disengaged from the upper surface of the second connector 18, and is engaged with the side surface thereof, thereby preventing the lamp body 14 from rotating in a reverse direction. At this time, the screw hole 22 is aligned with the screw hole 23, and a screw is passed through these screw holes, thereby fixing the rotation position of the lamp body 14. Thereafter, the lens 20 is attached to the guide plate 21, thus completing the mounting of the electrical unit 1 on the molded ceiling W.

As described above, in this embodiment, the fixing bracket 7 is mounted on the molded ceiling W, and then the lamp body 14 is pushed upward, and is rotated horizontally. Merely by doing so, the connection of the first connector to the second connector can be easily completed. And besides, the completion of this connection can be perceived through a sound and a touch obtained when the projection 12 is disengaged from the upper surface of the second connector 18 with the aid of the leaf spring 13, and also since the screw hole 22 is aligned with the screw hole 23, the completion of the connection can be easily confirmed. Therefore, the efficiency of the mounting operation is markedly enhanced.

By merely rotating the first connector 2 through about 90 degrees about the rotation guide shaft 10, the connection of the first connector 2 to the second connector 18 can be completed, and therefore the wires 3 connected to the first connector 2 do not need to have an excessive length. The cutting and short-circuiting of the wires, which would occur when the wires 3 are inadvertently clamped by the molded ceiling W during the operation, are positively prevented.

Furthermore, the connection between the first connector 2 and the second connector 18 can be achieved by rotating the lamp body 14 in a horizontal plane, and therefore an extra space is not required in the vertical direction, and the mounting operation can be carried out in a compact space.

In the electrical unit-mounting structure of the present invention, after the fixing bracket is mounted on the wall surface, the connection of the first connector to the second connector can be easily completed merely by pushing the electrical appliance upward and then by rotating it in a horizontal plane. Also, the fixing projection is brought out of engagement with the upper surface of the second connector with the aid of the resilient member when the two connectors are connected together, and therefore the completion of the connection can be confirmed, thus markedly enhancing the efficiency of the operation. And besides, since it is not required to provide an extra space in the vertical direction, the mounting operation can be carried out in a compact space.

Furthermore, since the first connector can be connected to the second connector merely by rotating the first connector through about 90 degrees about the rotation guide shaft, the wires do not need to have an excessive length. Therefore, there is not provided any extra portion of the wire which would otherwise be clamped by the wall surface due to a mistake in the operation, and the cutting and short-circuiting of the wires can be positively prevented, thereby further enhancing the reliability of the electrical unit.

What is claimed is:

1. A structure of mounting an electrical apparatus, comprising:

a fixing bracket;

a first electrical connector mounted on said fixing bracket;

a guide groove formed in said fixing bracket;

a first guide shaft formed on said first connector, said first guide shaft being moved along said guide groove;

withdrawal prevention means for preventing withdrawal of said first connector from said fixing bracket;

a second guide shaft for guiding a rotation of said apparatus, said second guide shaft being mounted on said fixing bracket;

a guide bearing receiving therein said second guide shaft, said guide bearing being formed on a body of said apparatus; and a second electrical connector formed on said body, wherein said second connector is connected to said first connector by the rotation of said apparatus around said first guide shaft.

2. The structure of mounting an apparatus of claim 1, wherein said withdrawal prevention means includes a withdrawal prevention projection formed on said first guide shaft.

3. The structure of mounting an apparatus of claim 1, wherein a rotation stopping projection is formed on said second guide shaft, and a L-shaped guide groove is formed in said guide bearing.

4. The structure of mounting an apparatus of claim 1, further comprising:

a resilient member formed on said fixing bracket;

a rotation fixing projection formed on said resilient member; and a rotation fixing hole engaged with said rotation fixing projection, said rotation fixing hole being formed in an upper surface of said first connector, wherein when said first connector is completely connected to said second connector, said rotation fixing projection is held against a side surface of said second connector, thereby preventing a reverse rotation of said apparatus.

5. The structure of mounting an apparatus of claim 1, wherein said guide groove is arcuately shaped.

6. The structure of mounting an apparatus of claim 1, wherein a thin connection member is integrally molded with said first connector and said fixing bracket to connect them together, said thin connection member being cut off when said apparatus is rotated.

* * * * *